UNITED STATES PATENT OFFICE.

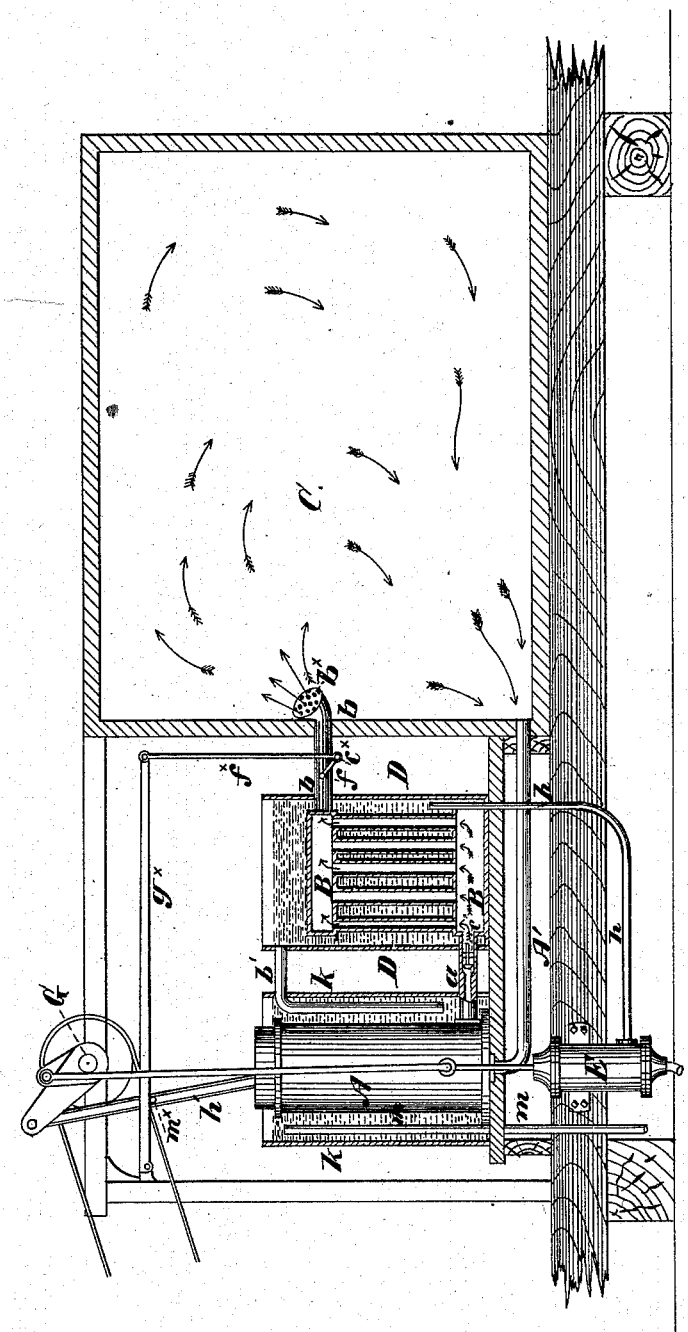

JAMES A. WHITNEY, OF NEW YORK, N. Y.

REFRIGERATING APPARATUS.

SPECIFICATION forming part of Letters Patent No. 249,433, dated November 8, 1881.

Application filed November 3, 1879.

*To all whom it may concern:*

Be it known that I, JAMES A. WHITNEY, of the city, county, and State of New York, have invented certain Improvements in Refrigerating Apparatus, of which the following is a specification.

This invention relates to the preservation of meats, vegetables, fruits, &c., by means of air artificially cooled by first subjecting it to compression, then eliminating or absorbing the heat evolved or made sensible by such compression, and subsequently permitting the air to expand.

My said invention comprises the combination, with an air-cooling apparatus constructed for the elimination by a cooling agent of the heat from the air under compression, of a valve or cock arranged to operate in unison with the air-cooling apparatus and with a preserving chamber or room connected with said apparatus by a suitable pipe, the whole so constructed and arranged that the air under compression is (to the requisite extent) held subject to the action of the cooling agent previous to being permitted to expand into the room or chamber aforesaid. A very effective removal of the heat from the compressed air, and the corresponding reduction of its temperature when expanded, being thus provided for.

The drawing represents a vertical sectional view of a refrigerating apparatus constructed for operation according to my invention.

As represented in the drawing, the air-compressing apparatus is provided with an air-compressing pump, A, the inlet-pipe A' of which connects with the interior of the provision-chamber or chill-room C, which latter, when the apparatus is in use, is practically closed against access of the external atmosphere. The outlet-pipe $a$ of this air-forcing pump A is connected with the tubular reservoir B, into which the air from the pump A is compressed, the pipe $a$ having a valve, $c$, to prevent the reflux of the air from the reservoir to the pump during the reverse movement of the piston of the latter. The reservoir B communicates by an outlet-pipe, $b$, with the interior of the provision-chamber or chill-room C. In the pipe $b$ is placed a valve or cock (indicated at $f$) of any suitable kind, and operated by any suitable means or mechanism—for example, that hereinafter explained—and which, by closing or diminishing to any required extent the outflow of the air from the compressing apparatus to the provision-chamber or chill-room, insures the proper retention of the air under compression for a sufficient length of time to permit or insure the requisite elimination or absorption of the heat-evolved. The end of the pipe $b$, communicating with the provision-chamber or chill-room C, is provided with a distributer for directing or causing the passage of the cooled air to different parts of the provision-chamber or chill-room, which distributer may consist of a bulb, $b^\times$, the openings in which are divergent to each other, so that as the air issues under pressure from the pipe $b$ through this distributer $b^\times$ it is divided into a number of currents, which are directed toward different parts of the provision-chamber or chill-room, so that the air shall be caused to circulate throughout the said provision-chamber or chill-room instead of being limited in its movement to any particular part thereof.

In lieu of the bulb with its divergent openings, mechanical equivalents of said device may be employed to insure the desired distribution of the cooled air—as, for example, a peforated pipe or pipes of any desired length extended into or around the provision-chamber or chill-room may be used, or a system of pipes having ends opening at different parts of said chamber or room may be used, the *modus operandi* or function and purpose being the same in either case.

The reservoir B is surrounded by a water-tank, D, through which water at an ordinary or suitably low temperature is caused to flow. This water surrounding the tubes of the reservoir B and in contact therewith rapidly absorbs the heat evolved from the air under compression in the said reservoir, so that when the air is liberated and caused to expand to and within the provision-chamber or chill-room C its temperature is reduced in due ratio. This water-supply in the compressing apparatus, as represented in the drawing, is secured by means of a pump, E, which may be actuated from the same driving-shaft G that operates the air-compressing pump A. The pump E draws its water from any suitable source of water-supply on shipboard from the sea itself. On land, where a suitable head of water may be obtained, such head of water may be substituted for the pump E. The water passes from the pump E through the pipe $h$ into the lower part of the tank D, and out from the upper part of the latter through a pipe, $b'$, into a water-jacket, $k$, provided around the barrel of the air-forcing pump A, the water then making its exit through the waste-pipe $m$. The office of the water-jacket around the air-forcing pump A is to prevent the undue heating of the pump by the heat evolved from the air compressed within it, and also in a measure to assist the water in the tank D around the reservoir B in the elimination or absorption of the heat evolved from the air by compression, as hereinbefore specified.

The valve or cock $f$ in the outlet-pipe $b$ of the receiver B is provided with an arm or lever, $c^x$, by means of which the valve may be opened or closed, either wholly or in part—for example, closed to retain the air under compression in the reservoir B; opened to permit the ejectment of the air from the reservoir into the provision-chamber or chill-room C; or partially closed, if such should be found expedient, to permit the outflow of air from the reservoir B to the provision-chamber or chill-room C, in such ratio as to still secure the proper compression of the air in the reservoir without interrupting the passage of air from the reservoir to the provision-chamber or chill-room. The outer extremity of the arm $c^x$ is connected by a rod, $f^x$, to the free end of a lever, $g^x$, the pitman or connecting-rod $h'$ of which actuates the piston of the air-compressing pump A, and is provided with a laterally-projecting stud or pin, $m^x$, which, when the piston of the said air-forcing pump A has nearly reached the limit of its upward stroke, strikes the under side of the lever $g^x$, and, lifting the same, actuates the arm $c^x$ of the valve or cock $f$ to open the pipe $b$ and permit the ejectment of the compressed air from the reservoir B into the provision-chamber or chill-room C, the lever being of sufficient weight or otherwise sufficiently loaded to insure a reserve movement of the arm $c^x$ on the descent of the piston of the air-forcing pump A, thereby turning the valve or cock $f$ to close the pipe $b$, while air is being again compressed into the reservoir B.

The operation of the invention is therefore, in brief, as follows: A portion of the air contained within the provision-chamber or chill-room C is drawn therefrom through the pipe $A'$ into the air-forcing pump A, and then forced by the latter through the pipe $a$ into the reservoir B, the cock or valve $f$ being in position to close the pipe $b$. In the meantime the water flowing through the tank D absorbs through the walls of the reservoir B the heat evolved by the compression of the air in the said reservoir, the air being held under compression in the reservoir during the greater portion of the upward stroke of the piston of the pump A. The lever $g^x$, being then lifted, as hereinbefore explained, operates the valve $f$ to open the pipe $b$, thereby permitting the compressed air from which the heat has been evolved and absorbed, as hereinbefore explained, to pass into and expand within the provision-chamber or chill-room C, the air as thus expanded being, of course, reduced in temperature, and the said air as it issues through the pipe $b$ into the provision-chamber or chill-room C, through the distributer $b^x$ of the pipe $b$, being directed to different parts of the said provision-chamber or chill-room C. The air contained within the provision-chamber or chill-room C is caused in this manner to pass repeatedly through the apparatus for compressing the air and eliminating or absorbing the heat evolved by such compression, and being thus repeatedly subjected to said operation it is reduced to and maintained at any required degree of temperature necessary in the preservation or storage of perishable articles of food. The degree of this temperature may, moreover, be regulated by simply regulating the speed at which the air-compressing apparatus is made to work, and also by regulating the temperature of the heat-absorbing medium provided to absorb the heat evolved from the air in its compressed condition.

It is to be understood that while I prefer water flowing in contact with the apparatus in which the air is compressed for the purpose of removing the evolved heat, yet any other means which will remove the heat evolved from the air under compression will, so far as concerns my invention, be simply an equivalent for the water flowing in contact with said air-compressing apparatus.

It is to be understood that in the automatic operation of the cock or valve $f$ any suitable mechanism for giving movement to said valve at proper intervals, and in proper unison with the working of the air-compressing pump, may be substituted for that shown in the drawing.

It is also to be understood that while the tubular reservoir B possesses advantages not inherent in any other construction of air-compressing apparatus, yet, so far as concerns certain features of my invention, air-compressing devices of different construction may be employed.

It is also to be understood that the arrangement of the pipes $b$ and $A'$, both of which pipes $b$ $A'$ connect with the provision-chamber or chill-room C, is such that the air passing into the provision-chamber or chill-room C and thence again to the pipe $A'$ is caused to circulate through said provision-chamber or chill-room over and over again.

In order to maintain the contained air at the requisite degree of dryness, there may be placed within the provision-chamber or chill-room an open vessel containing chloride of calcium or other substance capable of absorbing the surplus moisture from the air.

I do not claim a valve placed at the outlet of an air-cooling apparatus in which heat is eliminated from the air by a cooling agency when said valve is actuated by a thermostat, as set forth in Letters Patent No. 104,614, as the same does not act intermittently in connection with the air-cooling apparatus or with a preserving chamber or room, and inasmuch as the butterfly-valve therein shown would be inadequate to hold the air under compression for the practical cooling thereof; but

What I claim as my invention is—

The combination, with a preserving chamber or room and an air-cooling apparatus in which the heat is removed from the air under compression by a suitable cooling-agent, of a valve or cock arranged to operate intermittently in connection with the air-cooling apparatus to hold the air under compression while being cooled and to admit the cooled air to the preserving chamber or room intermittently, substantially as and for the purpose herein set forth.

JAMES A. WHITNEY.

Witnesses:
JAS. H. MATTHAEI,
CHAS. H. DOXAT.